(12) United States Patent
Sakurai et al.

(10) Patent No.: US 7,352,400 B2
(45) Date of Patent: Apr. 1, 2008

(54) SOLID-STATE IMAGE PICKUP APPARATUS HAVING A DIFFERENTIAL OUTPUT

(75) Inventors: Katsuhito Sakurai, Tokyo (JP); Toru Koizumi, Kanagawa (JP); Hiroki Hiyama, Kanagawa (JP); Masaru Fujimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 799 days.

(21) Appl. No.: 10/323,632

(22) Filed: Dec. 20, 2002

(65) Prior Publication Data

US 2003/0117510 A1 Jun. 26, 2003

(30) Foreign Application Priority Data

Dec. 26, 2001 (JP) .............................. 2001-394303

(51) Int. Cl.
H04N 5/217 (2006.01)
H04N 3/14 (2006.01)
H04N 5/335 (2006.01)

(52) U.S. Cl. ...................... 348/308; 348/302; 348/307; 348/241

(58) Field of Classification Search ................ 348/308, 348/241, 302, 307, 294
See application file for complete search history.

(56) References Cited

U.S. PATENT DOCUMENTS

| | | | | |
|---|---|---|---|---|
| 4,045,817 A | * | 8/1977 | Nakatani et al. | 348/304 |
| 4,067,046 A | * | 1/1978 | Nakatani et al. | 348/308 |
| 4,145,721 A | * | 3/1979 | Beaudouin et al. | 358/463 |
| 4,495,523 A | * | 1/1985 | Ozawa | 358/482 |
| 4,500,927 A | * | 2/1985 | Ozawa | 358/482 |
| 4,511,804 A | * | 4/1985 | Ozawa | 358/463 |
| 4,733,097 A | * | 3/1988 | Iwabuchi et al. | 358/482 |
| 5,955,753 A | * | 9/1999 | Takahashi | 257/292 |
| 6,002,287 A | | 12/1999 | Ueno et al. | 327/307 |
| 6,801,253 B1 | * | 10/2004 | Yonemoto et al. | 348/241 |

\* cited by examiner

*Primary Examiner*—Lin Ye
*Assistant Examiner*—Richard M Bemben
(74) *Attorney, Agent, or Firm*—Fitzpatrick, Cella, Harper & Scinto

(57) ABSTRACT

An image pickup apparatus including: a plurality of photoelectric conversion elements for photoelectrically converting light from an object, a first output line to which signals from the plurality of photoelectric conversion elements are successively outputted, a plurality of first switches connected to the first output line to output the signals from the plurality of photoelectric conversion elements to the first output line, a second output line to which a reference signal is supplied, a plurality of second switches connected to the second output line to supply the reference signal to the second output line, a scanning circuit which controls the plurality of first switches and the plurality of second switches, and a differential circuit which obtains a difference between the signal from the first output line and the signal from the second output line.

3 Claims, 8 Drawing Sheets

SOLID-STATE IMAGE PICKUP APPARATUS HAVING A DIFFERENTIAL OUTPUT

BACKGROUND OF THE INVENTION

1. Field of the Invention

The present invention relates to an image pickup apparatus for picking up an image of an object.

2. Related Background Art

In recent years, for the promotion of high resolution, the cell size reduction of photoelectric conversion devices employing the miniaturization process has been vigorously carried out, while an amplification type solid-state image pickup device which is capable of amplifying a photoelectric conversion signal to output the resultant signal thus amplified has received much attention in order to avoid the reduction in magnitude of photoelectric conversion output signals or the like due to the miniaturization process.

As for such amplification type solid-state image pickup devices, there are devices of a MOS type, an AMI type, a CMD type, a BASIS type, and the like. Of those, the MOS type solid-state image pickup device is constructed such that optical carriers generated in a photodiode are accumulated in a gate electrode of a MOS transistor, and in accordance with the driving timing provided from a scanning circuit, the potential change thereof is amplified in terms of the electric charges to be outputted to an output unit.

Of the MOS type solid-state image pickup devices, a CMOS type solid-state image pickup device which, including its peripheral circuit unit, is wholly realized through the CMOS process has especially received attention.

FIG. 5 is an equivalent circuit diagram of a conventional CMOS solid-state image pickup device. FIG. 7 is a schematic mounting plan view of horizontal transfer switches N511 to N513, a reset switch N514, a horizontal scanning circuit block 5, and a differential amplifier circuit 51 shown in FIG. 5. By the way, FIG. 7 shows the situation in which the above-mentioned constituent elements are connected to one another through two wiring layers consisting of a first wiring layer and a second wiring layer.

The CMOS type solid-state image pickup device shown in FIG. 5 includes a pixel unit 1, a vertical scanning circuit block 2, a horizontal scanning circuit block 5, an input MOS transistor N51, load MOS transistors N52 to N54, clamp capacitors C01 to C03, clamp switches N55 to N57, transfer switches N58 to N510, signal holding (storage) capacitors CT1 to CT3, horizontal transfer switches N511 to N513, a reset switch N514, and the differential amplifier circuit 51 all of which will be described hereinbelow.

Photodiodes D11 to D33 provided in the pixel unit 1 generate optical signal electric charges. In this case, the anode sides of the photodiodes D11 to D33 are grounded. The cathode sides of the photodiodes D11 to D33 are respectively connected to gates of amplification MOS transistors M311 to M333 through transfer MOS transistors M111 to M133.

In addition, to the gates of the amplification MOS transistors M311 to M333, sources of reset MOS transistors M211 to M233 for reset of these gates are respectively connected. Drains of the reset MOS transistors M211 to M233 are connected to a reset power source.

Furthermore, drains of the amplification MOS transistors M311 to M333 are connected to a power source and sources thereof are respectively connected to drains of selection MOS transistors M411 to M433. A gate of the transfer MOS transistor M111 is connected to a first row selection line (vertical scanning line) PTX1 which is arranged so as to extend transversely.

Gates of the similar transfer MOS transistors M121 and M131 of other pixel cells which are arranged in the same row are also commonly connected to the first row selection line PTX1. A gate of the MOS transistor M211 is connected to a second row selection line (vertical scanning line) PRES1 which is arranged so as to extend transversely.

Gates of the similar reset MOS transistors M221 and M231 of other pixel cells which are arranged in the same row are also commonly connected to the second row selection line PRES1. A gate of the selection MOS transistor M411 is connected to a third row selection line (vertical scanning line) PSEL1 which is arranged so as to extend transversely.

Gates of the similar selection MOS transistors M421 and M431 of other pixel cells which are arranged in the same row are also commonly connected to the third row selection line PSEL1. The first to third row selection lines are connected to the vertical scanning circuit block 2, and a signal voltage is supplied thereto on the basis of the operating timing which will be described later.

In the remaining rows shown in FIG. 5, the pixel cells having the same structure and the row selection lines are provided. PTX2 and PTX3, PRES2 and PRES3, and PSEL2 and PSEL3 which are formed in the vertical scanning circuit block 2 are supplied to these row selection lines. A source of the selection MOS transistor M411 is connected to a vertical signal line V1 which is arranged so as to extend longitudinally.

Sources of the similar selection MOS transistors M412 and M413 of the pixel cells which are arranged in the same row are also connected to the vertical signal line V1. The vertical signal line V1 is connected to a load MOS transistor N52 as load means.

Likewise, the selection MOS transistors and the load MOS transistors are connected to the remaining vertical signal lines V2 and V3 shown in FIG. 5.

Furthermore, sources of the load MOS transistors N52 to N54 are connected to a common GND line 4, and gates thereof are commonly connected to both of a gate and a drain of the input MOS transistor N51 and also are coupled to a voltage input terminal Vbias.

The vertical signal line V1 is connected to a capacitor CT1 for temporarily holding a signal through the clamp capacitor C01 and the transfer switch N58, and also is connected to an inverting input terminal (horizontal output line) of the differential amplifier circuit 51 through the horizontal transfer switch N511.

A non-inverting input terminal and an inverting input terminal of the differential amplifier circuit 51 are respectively coupled to a reset voltage Vres of the horizontal output line and a reset voltage Vres of the horizontal output line through the reset switch N514. The other terminal of the signal holding capacitor CT1 is grounded.

A junction point between the clamp capacitor C01 and the transfer switch N58 is connected to a clamp power source through the clamp switch N55. A gate of the horizontal transfer switch N511 is connected to a signal line H1 and the horizontal scanning circuit block 5.

The reading-out circuits having the same configuration are respectively provided in the remaining columns V2 and V3 shown in FIG. 5. In addition, gates of the clamp switches N55 to N57 which are connected to the respective columns and gates of the transfer switches N58 to N510 which are connected to the respective columns are commonly connected to a clamp signal input terminal PCOR and a transfer signal input terminal PT, respectively, and the signal voltages are respectively supplied thereto on the basis of the operating timing as will be described later.

FIG. 6 is a timing chart useful in explaining the operation of the CMOS type solid-state image pickup device shown in FIG. 5. Prior to the operation for reading out the optical signal electric charges from the photodiodes D11 to D33, the levels at the gates PRES1 of the reset MOS transistors M211 to M231 go high.

As a result, the gates of the amplification MOS transistors M311 to M331 are reset to the reset power source. After the levels at the gates PCOR of the clamp switches N55 to N57 go high at the same time as the levels at the gates PRES1 of the reset MOS transistors M211 to M231 return back to the low level, the levels at the gates PSEL1 of the selection MOS transistors M411 to M431 go high.

As a result, a reset signal (noise signal) on which the reset noise is superimposed is read out to the vertical signal lines V1 to V3 to be clamped in the clamp capacitors C01 to C03. At the same time, the levels at the gates PT of the transfer switches N58 to N510 go high and the signal holding capacitors CT1 to CT3 are reset to a clamp voltage.

Next, the levels at the gates PCOR of the clamp switches N55 to N57 return back to the low level. Next the levels at the gates PTX1 of the transfer MOS transistors M111 to M131 go high, and an optical signal is read out to the vertical signal lines V1 to V3 at the same time as the optical signal electric charges of the photodiodes D11 to D31 are transferred to the gates of the amplification MOS transistors M311 to M331.

Next, after the levels at the gates PTX1 of the transfer MOS transistors M111 to M131 have returned back to the low level, the levels at the gates PT of the transfer switches N58 to N510 go low. As a result, a signal corresponding to change (optical signal) from the reset signal is read out to the signal holding capacitors CT1 to CT3.

In the operation up to here, the optical signals of the pixel cells connected to the first row are respectively held in the signal holding capacitors CT1 to CT3 connected to the respective columns.

Next, the levels at the gates PRES1 of the reset MOS transistors M211 to M231 and the levels at the gates PTX1 of the transfer MOS transistors M111 to M131 go high, and the optical signal electric charges of the photodiodes D11 to D31 are reset.

Thereafter, the levels at the gates of the horizontal transfer switches N511 to N513 in the respective columns successively go high with the signals which are supplied from the horizontal scanning circuit block 5 to be transmitted through the signal lines H1 to H3, and the voltages which are respectively held in the signal holding capacitors CT1 to CT3 are successively read out to the horizontal output line to be successively outputted to the output terminal OUT.

The horizontal output line is reset to a reset voltage Vres with the reset switch N514 between reading-out operations of the signals in the columns. Thus, the operation for reading out the signals of the pixel cells connected to the first row is completed. Likewise, the signals of the pixel cells connected to the rows in and after the second row are successively read out with the signals from the vertical scanning circuit block to complete the operation for reading out the signals of all of the pixel cells.

However, in the prior art, the horizontal output line to which the sources of the horizontal transfer switches N511 to N513 are commonly connected is capacitively coupled to the signal lines H1 to H3 for driving of the gate terminals through the gate-to-source capacitors of the horizontal transfer switches N511 to N513.

In addition, the horizontal output line overlaps the wiring of the signal lines H1 to H3 from the horizontal scanning circuit block 5 to be capacitively coupled thereto. The signals passing through the signal lines H1 to H3 are supplied from the power source of the horizontal scanning circuit block 5 and GND, and as a result the horizontal output line is capacitively coupled to the power source of the horizontal scanning circuit block 5 and GND.

Furthermore, the wiring of the horizontal output line is provided above a semiconductor substrate and hence is also capacitively coupled to the semiconductor substrate. As in the driving method described with reference to FIG. 6, the inverting input terminal of the differential amplifier circuit 51 is in the state of high impedance (floating) at the timing when the signal is read out to the horizontal output line, and hence is easily affected by the disturbance noise generated due to the capacitive coupling.

In general, in many cases, the power source for the horizontal scanning circuit block 5 and GND have the spike-like noise superimposed thereon due to the influence of the through current in a digital circuit or the like. Thus, this noise exerts an influence on the horizontal output line. As a result, there is encountered the problem that the noise exerts an influence on an output waveform (sensor output waveform) of the differential amplifier circuit 51 so that it is impossible to obtain the essential image of an object.

SUMMARY OF THE INVENTION

An object of the present invention is to provide an image pickup apparatus which suppresses an influence of the noise or the like.

In order to attain the above-mentioned object, according to an aspect of the present invention, there is provided an image pickup apparatus including:

a plurality of photoelectric conversion elements for photoelectrically converting light from an object;

a first output line to which signals from the plurality of photoelectric conversion elements are successively outputted;

a plurality of first switches connected to the first output line to output the signals from the plurality of photoelectric conversion elements to the first output line;

a second output line to which a reference signal is supplied;

a plurality of second switches connected to the second output line to supply the reference signal to the second output line;

a scanning circuit which controls the plurality of first switches and the plurality of second switches; and a differential circuit which obtains a difference between the signal from the first output line and the signal from the second output line.

The other objects and characteristics of the present invention will be apparent from the following specification and drawings.

BRIEF DESCRIPTION OF THE DRAWINGS

The above and other objects as well as advantages of the present invention will become clear by the following description of the preferred embodiments of the present invention with reference to the accompanying drawings, wherein.

DESCRIPTION OF THE PREFERRED EMBODIMENTS

The preferred embodiments of the present invention will hereinafter be described in detail with reference to the accompanying drawings.

First Embodiment

Figure 1:
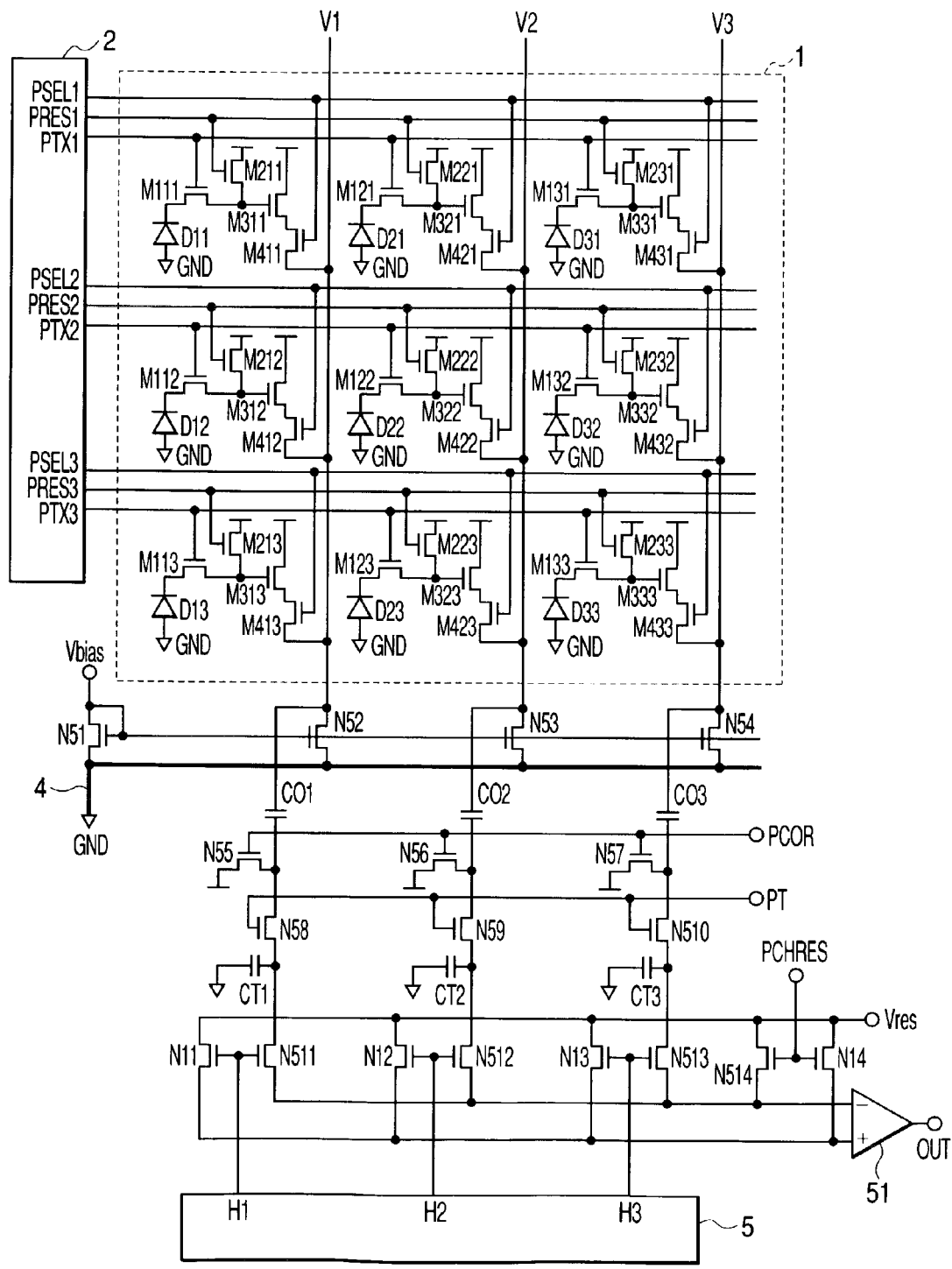
FIG. 1 is an equivalent circuit diagram showing a configuration of a solid-state image pickup device according to a first embodiment of the present invention.
Figure 5:
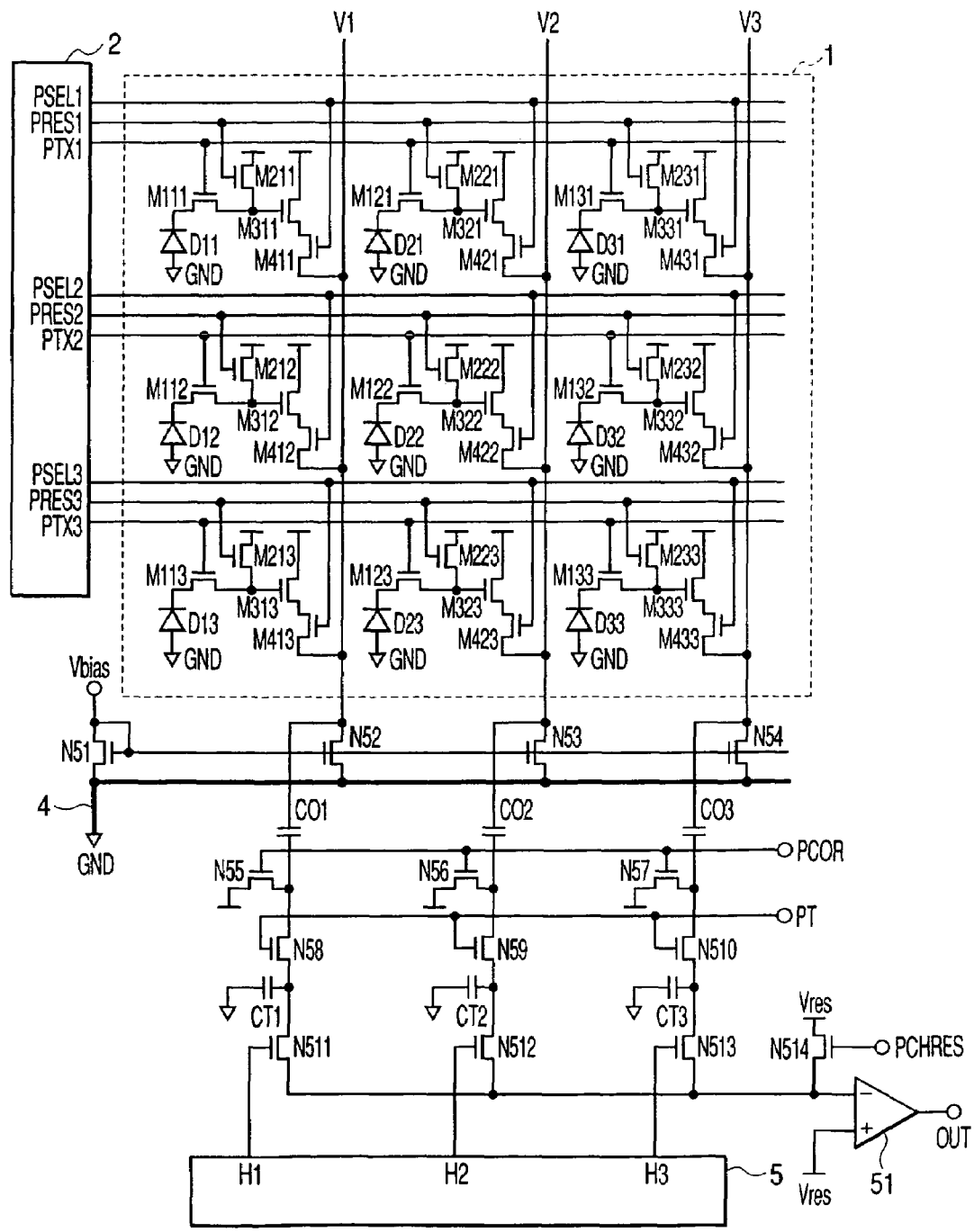
FIG. 5 is an equivalent circuit diagram showing a configuration of a conventional CMOS type solid-state image pickup device.

FIG. 1 is an equivalent circuit diagram showing a configuration of a solid-state image pickup device according to a first embodiment of the present invention. In FIG. 1, a pixel unit 1, an input MOS transistor N51, load MOS transistors N52 to N54, clamp capacitors C01 to C03, clamp switches N55 to N57, transfer switches N58 to N510, and signal holding capacitors CT1 to CT3 are the same in configuration as those shown in FIG. 5. By the way, in FIG. 1, the same constituent elements as those shown in FIG. 5 are denoted by the same reference numerals.

The capacitors CT1 to CT3 for temporarily holding signals are connected to an inverting input terminal (horizontal output line) of a differential amplifier circuit 51 through horizontal transfer switches N511 to N513, respectively, and the horizontal output line is connected to a reset voltage Vres through a reset switch N514.

Gates of the horizontal transfer switches N511 to N513 are respectively connected to signal lines H1 to H3 to be connected to a horizontal scanning circuit block 5.

Switches N11 to N13 having respective drains coupled to the reset voltage Vres are connected to a non-inverting input terminal of the differential amplifier circuit 51, and gates of the switches N11 to N13 are respectively connected to the signal lines H1 to H3, likewise the horizontal transfer switches N511 to N513.

In addition, the non-inverting input terminal of the differential amplifier circuit 51 is coupled to the reset voltage Vres through the reset switch N14.

Although not particularly limited, it is desirable that the horizontal transfer switches N511 to N513 and the switches N11 to N13 are identical in shape to one another, and also the reset switches N514 and N14 are identical in shape to one another.

In addition, while in FIG. 1, the two-dimensional pixel array of 3(row)×3(column) is illustrated for the sake of simplicity, it is to be understood that the present invention is not intended to be limited to this size, and hence for a one-dimensional linear sensor as well, the similar configuration can be adapted.

Figure 6:
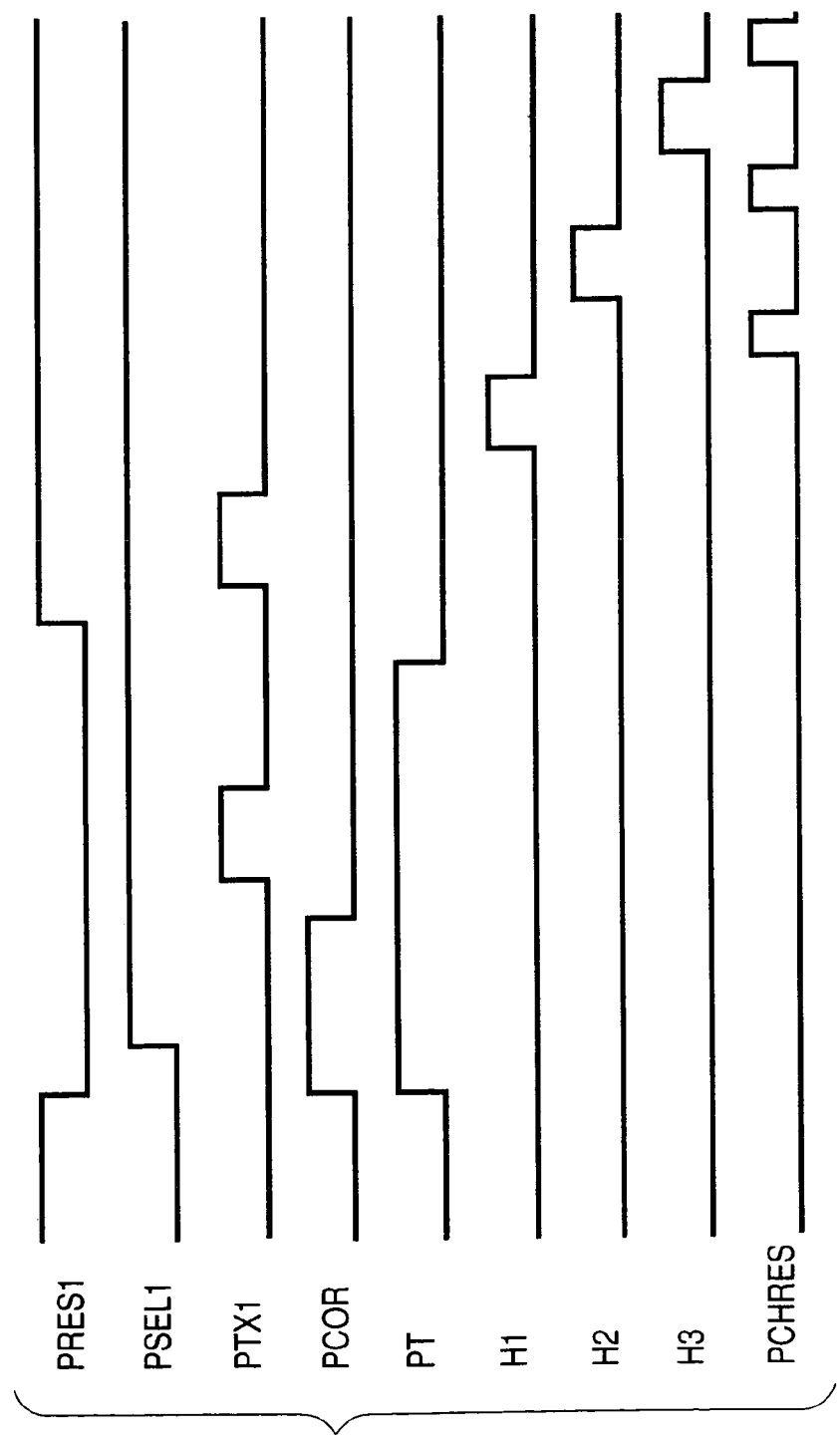
FIG. 6 is a timing chart useful in explaining the operation of the CMOS type solid-state image pickup device shown in FIG. 5.
Figure 7:
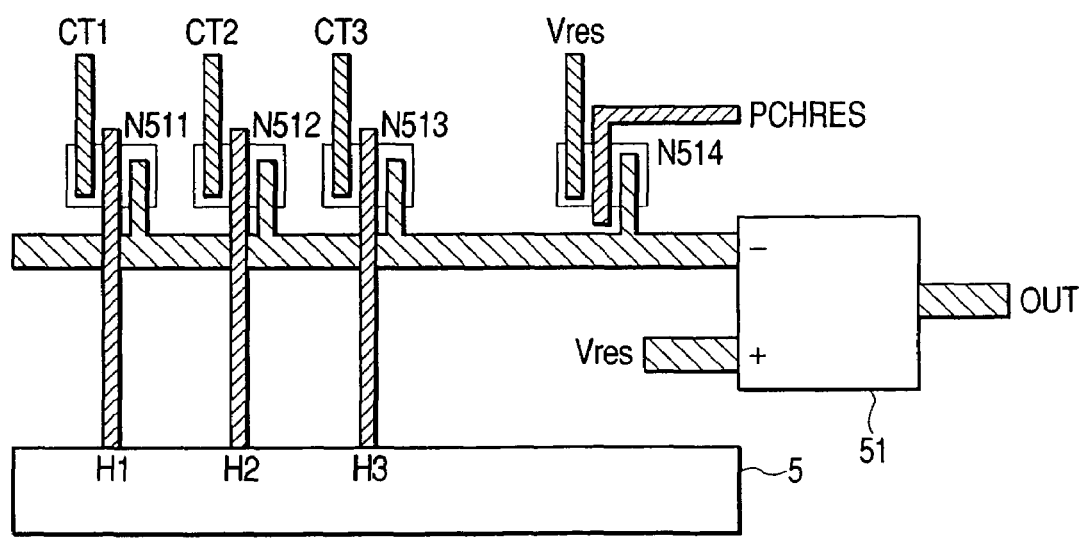
FIG. 7 is a schematic mounting plan view of horizontal transfer switches N511 to N513, a reset switch N514, a horizontal scanning circuit block 5, and a differential amplifier circuit 51 shown in FIG. 5.

Next, the description will hereinbelow be given with respect to the operation of the solid-state image pickup device of the present embodiment. The description for the operation until the signals are respectively held in the signal holding capacitors CT1 to CT3 is the same as that based on FIG. 6.

The levels at gates of the horizontal transfer switches N511 to N513 in the respective columns successively go high with the signals which are supplied from the horizontal scanning circuit block 5 to be transmitted through the signal lines H1 to H3, respectively, so that the signals held in the signal holding capacitors CT1 to CT3 are read out to the horizontal output line.

In addition, the levels at gates of the switches N11 to N13 successively go high with the signals which are supplied from the horizontal scanning circuit block 5 to be transmitted through the signal lines H1 to H3, respectively, so that the reset voltage Vres is read out to the non-inverting input terminal of the differential amplifier circuit 51 in synchronism with the timing at which the signal is read out to the horizontal output line.

The horizontal output line and the non-inverting input terminal of the differential amplifier circuit 51 are reset by the reset switches N514 and N14 to the reset voltage Vres between reading-out operations the signals in the respective columns. The signal exhibiting the difference between the non-inverting input signal and the inverting input signal is amplified with a desired gain to be outputted to the output terminal OUT.

In such an operation, for example, the clock leakage of the signals which are supplied from the horizontal scanning circuit block 5 to be transmitted through the signal lines H1 to H3, and the reset signal PCHRES of the horizontal output line are generated in the horizontal output line. In addition, the horizontal output line is capacitively coupled to the signal lines H1 to H3 through the gate-to-source capacitors of the horizontal transfer switches N511 to N513.

Since the levels of the signals which are supplied from the horizontal scanning circuit block 5 to be transmitted through the signal lines H1 to H3 successively go high, the signals of the low level supplied from GND of the horizontal scanning circuit block 5 are outputted for most of the period of time.

Now, in the present embodiment, similarly to the horizontal output line, the reset switch N14 and the switches N11 to N13 having the respective gates to which the same signal as that of the horizontal transfer switch is inputted are also connected to the non-inverting input terminal of the differential amplifier circuit 51. Thus, similarly to the inverting input terminal, the clock leakage and the spike-like noise exert an influence on the non-inverting input terminal as well.

Since these noise components are the components which are in-phase between the inverting input terminal and the non-inverting input terminal and are removed through the differential amplifier circuit 51, they do not exert any influence on the output terminal OUT.

Second Embodiment

Figure 2A:
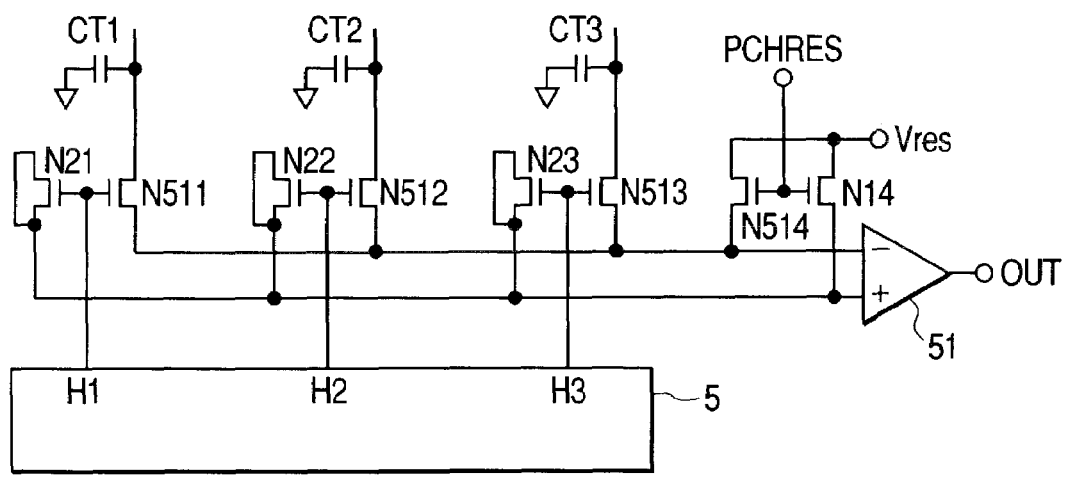
FIGS. 2A, 2B and 2C are respectively equivalent circuit diagrams each showing a configuration of a part of a solid-state image pickup device according to a second embodiment of the present invention.

FIG. 2A is an equivalent circuit diagram showing a configuration of a part of a solid-state image pickup device according to a second embodiment of the present invention. In FIG. 2A, there is shown a part which is arranged on the lower side in the drawing than the signal holding capacitors CT1 to CT3 shown in FIG. 1, and hence other constituent elements are the same in configuration as those shown in FIG. 1. By the way, in FIG. 2A, the same constituent elements are denoted by the same reference numerals as those shown in FIG. 1.

Similarly to FIG. 1, the capacitors CT1 to CT3 for temporarily holding signals are connected to the inverting input terminal (horizontal output line) of the differential amplifier circuit 51 through the horizontal transfer switches N511 to N513, respectively, and the horizontal output line is connected to the reset voltage Vres through the reset switch N514.

Gates of the horizontal transfer switches N511 to N513 are respectively connected to the signal lines H1 to H3 to be connected to the horizontal scanning circuit block 5.

Dummy switches N21 to N23 having a source and a drain commonly coupled are connected to the non-inverting input terminal of the differential amplifier circuit 51, and gates of the dummy switches N21 to N23 are respectively connected to the signal lines H1 to H3, likewise the horizontal transfer switches N511 to N513.

In addition, the non-inverting input terminal of the differential amplifier circuit 51 is coupled to the reset voltage Vres through the reset switch N14.

Next, the description will hereinbelow be given with respect to the operation of the solid-state image pickup device of the present embodiment. The description for the operation until the signals are respectively held in the signal holding capacitors CT1 to CT3 is the same as that based on FIG. 6.

The levels at gates of the horizontal transfer switches N511 to N513 in the respective columns successively go high with the signals which are supplied from the horizontal scanning circuit block 5 to be transmitted through the signal lines H1 to H3, respectively, so that the signals held in the signal holding capacitors CT1 to CT3 are read out to the horizontal output line.

In addition, the levels at gates of the dummy switches N21 to N23 successively go high with the signals transmitted through the same signal lines H1 to H3, respectively.

Inverting input terminal and the non-inverting input terminal of the differential amplifier circuit 51 are reset to the reset voltage Vres by the reset switches N514 and N14 between the reading-out operation of the signals in the respective columns.

The signal exhibiting the difference between the non-inverting input signal and the inverting input signal is amplified with a desired gain to be outputted to the output terminal OUT.

In such an operation, similarly to the first embodiment, the horizontal output line suffers the influence of the clock leakage and the disturbance noise such as the spike-like noise. However, since similarly to the horizontal output line, the reset switch N14 and the dummy switches N21 to N23 having the respective gates to which the same signal as that of the horizontal transfer switch is inputted are also connected to the non-inverting input terminal of the differential amplifier circuit 51, the non-inverting input terminal also suffers the similar influence of the clock leakage and the spike-like noise.

Since these noise components are the components which are in-phase between the inverting input terminal and the non-inverting input terminal and are removed through the differential amplifier circuit 51, they do not exert any influence on the output terminal OUT.

Figure 2B:
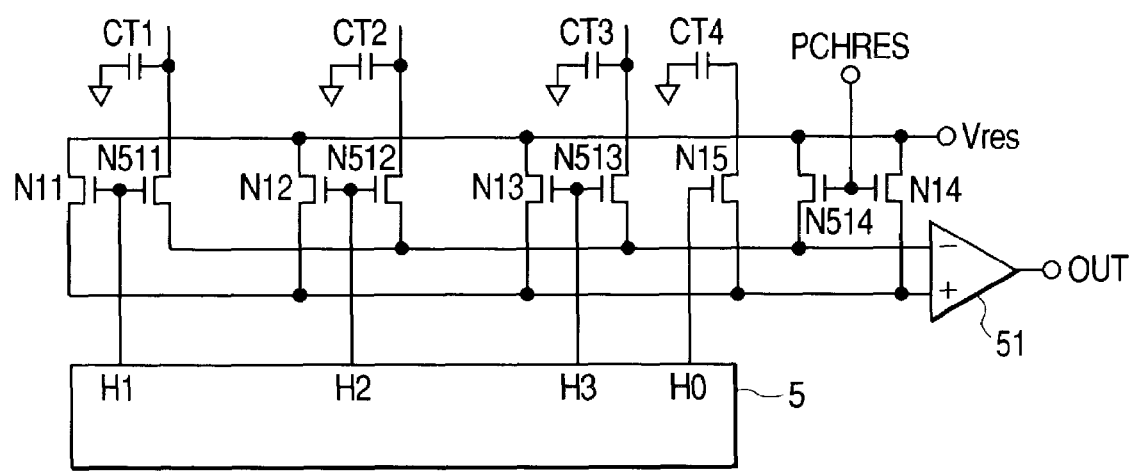
Figure 2C:
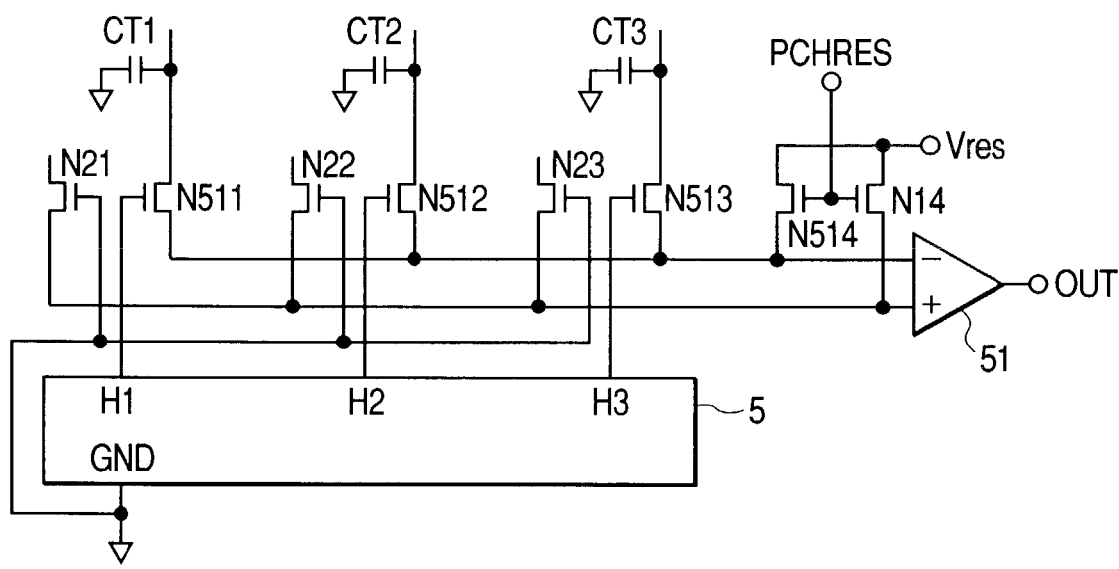

FIG. 2C is an equivalent circuit diagram showing a configuration of a part of another solid-state image pickup device of the second embodiment of the present invention. This solid-state image pickup device is different from the first embodiment in the connection of the dummy switches N21 to N23.

In the present embodiment, the gates of the dummy switches N21 to N23 are connected to the same GND as that of the horizontal scanning circuit block 5.

Since the levels of the signals which are supplied from the horizontal scanning circuit block 5 to be transmitted through the signal lines H1 to H3 successively go high, the signals of the low level supplied from GND of the horizontal scanning circuit block 5 are outputted for most of the period of time.

Consequently, even in the case where as in the present embodiment, the gates of the dummy switches N21 to N23 are connected to the same GND as that of the horizontal scanning circuit block 5, there is attained the same effects as those of the above-mentioned embodiment.

FIG. 2B is an equivalent circuit diagram showing a configuration of a part of a solid-state image pickup device according to the second embodiment of the present invention. In FIG. 2B, there is shown a part which is arranged on the lower side in the drawing than the signal holding capacitors CT1 to CT3 shown in FIG. 1, and hence other constituent elements are the same in configuration as those shown in FIG. 1. By the way, in FIG. 2B, the same constituent elements are denoted by the same reference numerals as those shown in FIG. 1.

Similarly to FIG. 1, the capacitors CT1 to CT3 for temporarily holding signals are connected to the inverting input terminal (horizontal output line) of the differential amplifier circuit 51 through the horizontal transfer switches N511 to N513, respectively, and the horizontal output line is connected to the reset voltage Vres through the reset switch N514.

Gates of the horizontal transfer switches N511 to N513 are respectively connected to the signal lines H1 to H3 to be connected to the horizontal scanning circuit block 5.

Switches N11 to N13 having respective drains coupled to the reset voltage Vres are connected to the non-inverting input terminal of the differential amplifier circuit 51, and gates of the switches N11 to N13 are respectively connected to the signal lines H1 to H3, likewise the horizontal transfer switches N511 to N513.

In addition, the source of the switch N15 having the drain connected to the dummy holding capacitor CT4 is connected to the non-inverting input terminal, and the gate of the switch N15 is connected to the signal line H0 from the horizontal scanning circuit block 5.

The capacitance value of the dummy holding capacitor CT4 is desirably equal to that of each of the signal holding capacitors CT1 to CT3 as much as possible.

In addition, although not particularly illustrated, the signal which is obtained by OR-processing the signals transmitted through the signal lines H1 to H3, respectively, is supplied to the signal line H0.

In addition, the non-inverting input terminal of the differential amplifier circuit 51 is coupled to the reset voltage Vres through the reset switch N14.

Next, the description will hereinbelow be given with respect to the operation of the solid-state image pickup device of the present embodiment. The description for the operation until the signals are respectively held in the signal holding capacitors CT1 to CT3 is the same as that based on FIG. 6.

The levels at gates of the horizontal transfer switches N511 to N513 in the respective columns successively go high with the signals which are supplied from the horizontal scanning circuit block 5 to be transmitted through the signal lines H1 to H3, respectively, so that the signals held in the signal holding capacitors CT1 to CT3 are read out to the horizontal output line.

Also, the levels at the gates of the switches N11 to N13 successively go high with the signals transmitted through the same signal lines H1 to H3, respectively. The reset voltage Vres is then read out to the non-inverting input terminal of the differential amplifier circuit 51 in synchronism with the timing at which the signal is read out to the horizontal output line. Moreover, the level at the gate of the switch N15 also goes high at the timing when the levels of the signals which are supplied from the horizontal scanning circuit block 5 to be transmitted through the signal lines H1 to H3, respectively, successively go high, so that the dummy holding capacitor CT4 is connected to the switch N15.

The horizontal output line and the non-inverting input terminal of the differential amplifier circuit 51 are reset to the reset voltage Vres by the reset switches N514 and N14 between the reading-out operation of the signals in the respective columns.

The signal exhibiting the difference between the non-inverting input signal and the inverting input signal is amplified with a desired gain to be outputted to the output terminal OUT.

In such an operation, the horizontal output line suffers the influence of the clock leakage and the disturbance noise such as the spike-like noise. However, since similarly to the horizontal output line, the reset switch N14 and the switches N11 to N13 having the respective gates to which the same signal as that of the horizontal transfer switch is inputted are also connected to the non-inverting input terminal of the differential amplifier circuit 51, the non-inverting input terminal also suffers the similar influence of the clock leakage and the spike-like noise shown in the example described above.

Furthermore, since the non-inverting input terminal of the differential amplifier circuit 51 is connected to the dummy holding capacitor CT4 through the switch N15 at the timing when the signal is read out to the horizontal output line, the capacity defined between the horizontal output line and GND and the capacity defined between the non-inverting input terminal of the differential amplifier circuit 51 and GND are equal to each other.

Since these noise components are the components which are in-phase between the inverting input terminal and the non-inverting input terminal and also the magnitudes of these noise components are equal to each other, they are removed through the differential amplifier circuit 51 and hence do not exert any influence on the output terminal OUT.

Third Embodiment

Figure 3:
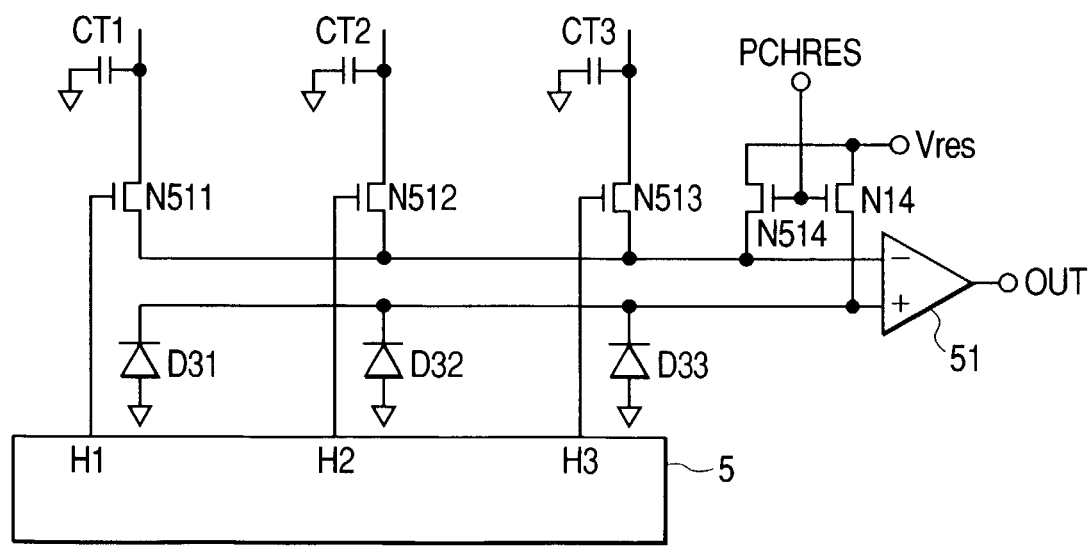
FIG. 3 is an equivalent circuit diagram showing a configuration of a part of a solid-state image pickup device according to a third embodiment of the present invention.

FIG. 3 is an equivalent circuit diagram showing a configuration of a part of a solid-state image pickup device according to a third embodiment of the present invention. In FIG. 3, there is shown a part that is arranged on the lower side in the drawing than the signal holding capacitors CT1 to CT3 shown in FIG. 1, and hence other constituent elements are the same in configuration as those shown in FIG. 1. By the way, in FIG. 3, the same constituent elements are denoted by the same reference numerals as those shown in FIG. 1.

The capacitors CT1 to CT3 for temporarily holding signals are connected to the inverting input terminal (horizontal output line) of the differential amplifier circuit 51 through the horizontal transfer switches N511 to N513, respectively, and the horizontal output line is connected to the reset voltage Vres through the reset switch N514.

Gates of the horizontal transfer switches N511 to N513 are respectively connected to the signal lines H1 to H3 to be connected to the horizontal scanning circuit block 5.

Diodes D31 to D33 each having the junction capacity equal to that of the source region of each of the horizontal transfer switches N511 to N513 are connected to the non-inverting input terminal of the differential amplifier circuit 51.

In addition, the non-inverting input terminal of the differential amplifier circuit 51 is coupled to the reset voltage Vres through the reset switch N14.

Next, the description will hereinbelow be given with respect to the operation of the solid-state image pickup device of the present embodiment. The description for the operation until the signals are respectively held in the signal holding capacitors CT1 to CT3 is the same as that based on FIG. 6.

The levels at gates of the horizontal transfer switches N511 to N513 in the respective columns successively go high with the signals which are supplied from the horizontal scanning circuit block 5 to be transmitted through the signal lines H1 to H3, respectively, so that the signals held in the signal holding capacitors CT1 to CT3 are read out to the horizontal output line.

The inverting input terminal and the non-inverting input terminal of the differential amplifier circuit 51 are reset to the reset voltage Vres by the reset switches N514 and N14 between the reading-out operation of the signals in the respective columns.

The signal exhibiting the difference between the non-inverting input signal and the inverting input signal is amplified with a desired gain to be outputted to the output terminal OUT.

In such an operation, similarly to the first embodiment, the horizontal output line suffers the influence of the clock leakage and the disturbance noise such as the spike-like noise. However, since similarly to the horizontal output line, the reset switch N14 is also connected to the non-inverting input terminal of the differential amplifier circuit 51, the non-inverting input terminal also suffers the similar influence of the clock leakage.

Since the clock leakage is a component which is in-phase between the inverting input terminal and the non-inverting input terminal and are removed through the differential amplifier circuit 51, they do not exert any influence on the output terminal OUT.

Fourth Embodiment

Figure 4A:
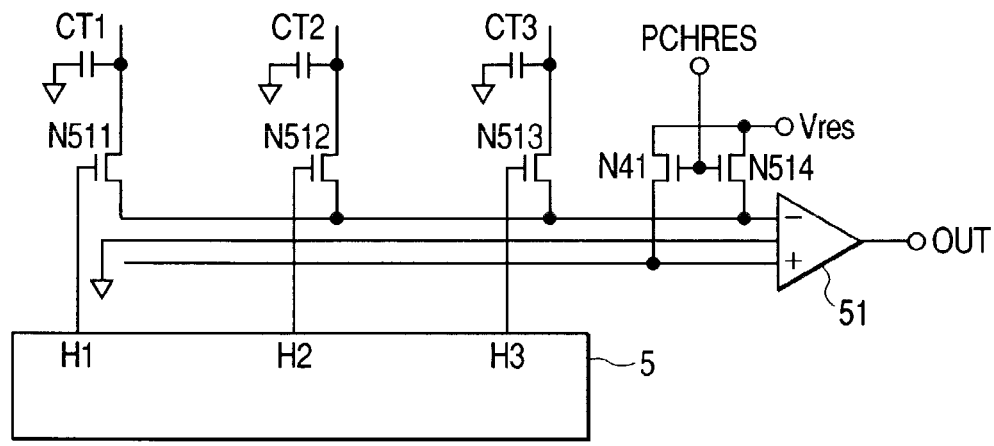
FIGS. 4A and 4B are respectively an equivalent circuit diagram showing a configuration of a part of a solid-state image pickup device according to a fourth embodiment of the present invention and a mounting plan view showing construction of a part thereof.

FIG. 4A is an equivalent circuit diagram showing a configuration of a part of a solid-state image pickup device according to a fourth embodiment of the present invention. In FIG. 4A, there is shown a part that is arranged on the lower side in the drawing than the signal holding capacitors CT1 to CT3 shown in FIG. 1, and hence other constituent elements are the same in configuration as those shown in FIG. 1. By the way, in FIG. 4A, the same constituent elements are denoted by the same reference numerals as those shown in FIG. 1.

Figure 4B:
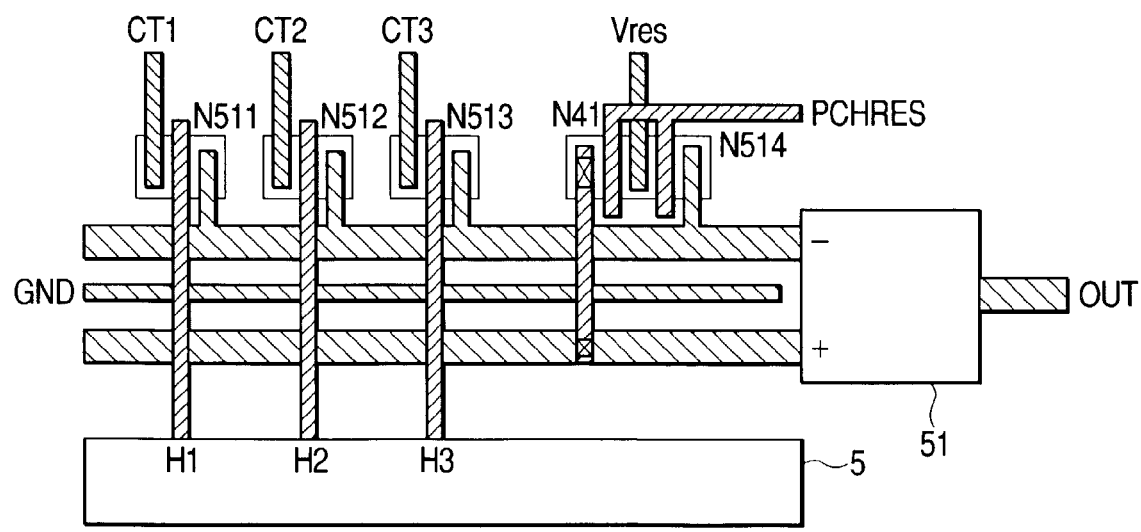

FIG. 4B is a mounting plan view of the horizontal transfer switches N511 to N513, the reset switches N514 and N41, the horizontal scanning circuit block 5, and the differential amplifier circuit 51 all of which are shown in FIG. 4A. By the way, in FIG. 4B, there is shown the arrangement in which the above-mentioned constituent elements are connected to one another through a first wiring layer, a second wiring layer, and a third wiring layer.

The wiring for the non-inverting input terminal of the differential amplifier circuit 51 is formed in such a way that the wiring concerned extends in parallel with the wiring (horizontal output line) for the inverting input terminal, and also the relationship of overlapping between the wiring concerned and the wiring for the signal lines H1 to H3 from the horizontal scanning circuit block 5 becomes equal to that of overlapping between the wiring concerned and the horizontal output line.

In addition, the area defined between the wiring for the non-inverting input terminal and the wiring for the horizontal output line is shielded with the GND wiring to suppress the cross-talk therebetween.

As shown in FIG. 4B, the horizontal output line and the signal lines H1 to H3 from the horizontal scanning circuit block 5 overlap each other to be capacitively coupled to each other.

In addition, the horizontal output line is arranged above the semiconductor substrate to be capacitively coupled to the semiconductor substrate as well. In the present embodiment, similarly to the first embodiment, the horizontal output line also suffers the influence of the disturbance noise.

For example, since the levels of the signals which are supplied from the horizontal scanning circuit block 5 to be transmitted through the signal lines H1 to H3 successively go high, the signals of the low level supplied from GND of the horizontal scanning circuit block are outputted for most of the period of time.

Also, the horizontal output line is also capacitively coupled to the semiconductor substrate, and hence when the noise is generated in GND of the horizontal scanning circuit block, or the power source or GND connected to the semiconductor substrate, the horizontal output line is affected by the noise. However, the horizontal output line is formed in such a way that the relationship of overlapping between the wiring for the non-inverting input terminal of the differential amplifier circuit 51 and the wiring for the signal lines H1 to H3 from the horizontal scanning block 5 becomes equal to that of overlapping between the horizontal output line concerned and the wiring for the signal lines H1 to H3 from the horizontal scanning block 5.

Consequently, the non-inverting input terminal also suffers the similar influence of the disturbance noise as described above. Since these noise components are the components which are in-phase between the inverting input terminal and the non-inverting input terminal and hence are removed through the differential amplifier circuit 51, they do not exert any influence on the output terminal OUT.

As in the first to fourth embodiments as described above, the coupling capacity defined between the horizontal output line through which the signals from the photoelectric conversion devices are successively outputted to the differential amplifier circuit, and the power source, GND, or the desired signal lines of the signal lines H1 to H3 is added to the coupling capacity defined between the output line through which the above-mentioned reference signal is supplied to the differential amplifier circuit and the above-mentioned desired signal lines, thereby being able to obtain an image of high picture quality.

Fifth Embodiment

Figure 8:
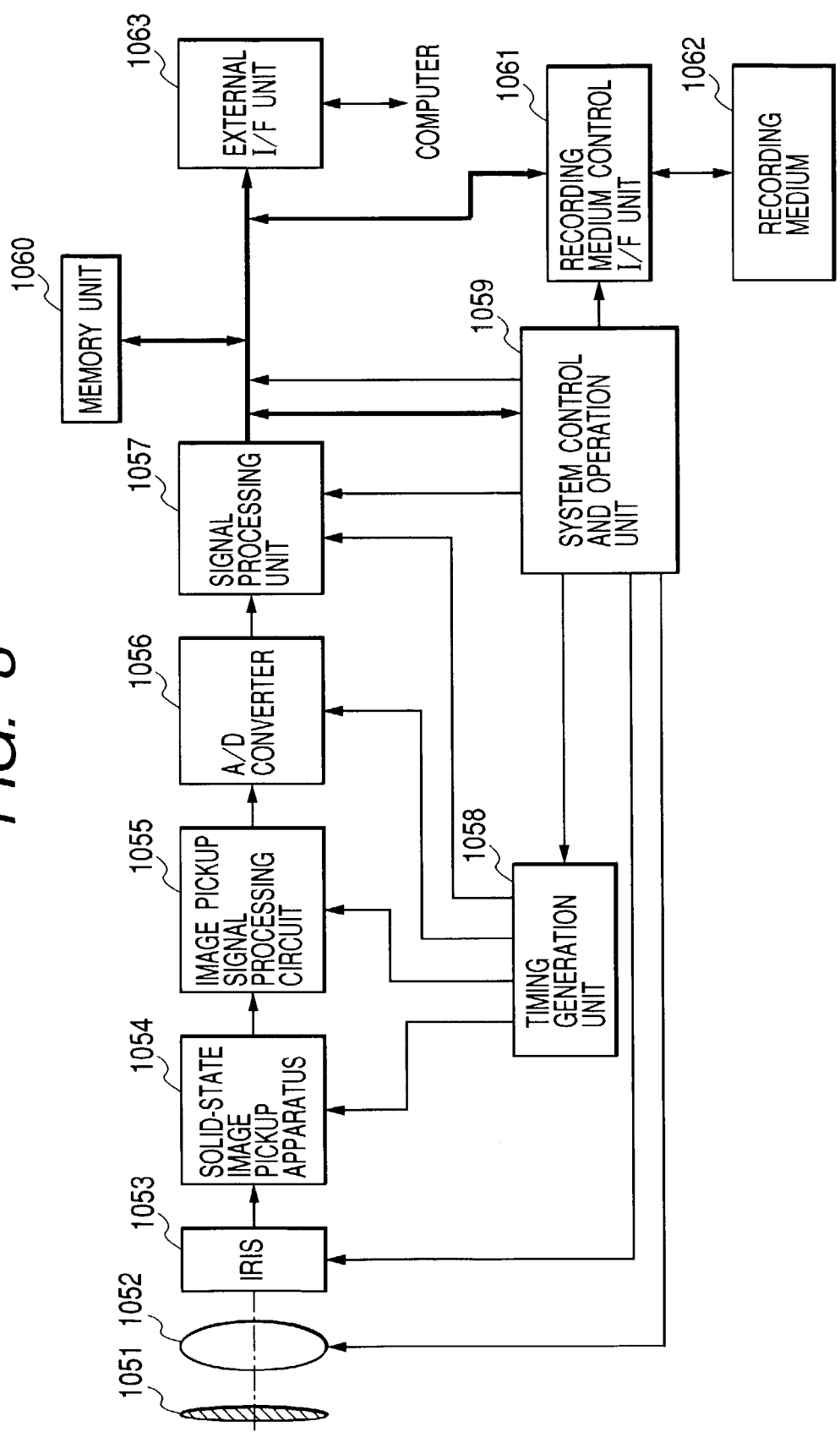
FIG. 8 is a schematic block diagram showing an internal configuration of a video camera including a solid-state image pickup device according to a fifth embodiment of the present invention.

FIG. 8 is a block diagram showing a schematic internal configuration of a digital still camera (image pickup apparatus) including the solid-state image pickup device according to the first to fourth embodiments of the present invention. In FIG. 8, reference numeral 1051 denotes a barrier serving both as a protector of a lens and a main switch; reference numeral 1052 denotes the lens for imaging an optical image of an object on a solid-state image pickup apparatus 1054 which was described in the first embodiment and the like; reference numeral 1053 denotes an iris for making variable a quantity of light passed through the lens 1052; reference numeral 1054 denotes an image pickup apparatus for taking in the object image imaged through the lens 1052 in the form of an image signal; reference numeral 1055 denotes an image pickup signal processing circuit for subjecting the image signal outputted from the image pickup apparatus 1054 to the various corrections, clamp, and the like; reference numeral 1056 denotes an A/D converter for subjecting the image signal outputted from the image pickup apparatus 1054 to analog-to-digital conversion; reference numeral 1057 denotes a signal processing unit for subjecting the image data outputted from the A/D converter 1056 to the various corrections and for compressing the data; reference numeral 1058 denotes a timing generation unit for outputting the various timing signals to the image pickup apparatus 1054, the image pickup signal processing circuit 1055, the A/D converter 1056, and the signal processing unit 1057; reference numeral 1059 denotes a system control and operation unit for carrying out the various arithmetic operations and for controlling the whole still video camera; reference numeral 1060 denotes a memory unit for storing temporarily therein the image data; reference numeral 1061 denotes a recording medium control I/F unit for recording or reading out the image data in or from a recording medium; reference numeral 1062 denotes the detachable recording medium, such as a semiconductor memory, for recording or reading out the image data therein or therefrom; and 1063 denotes an external I/F unit for carrying out communication with an external computer or the like.

Next, the description will hereinbelow be given with respect to the operation of the digital still camera having the above-mentioned configuration during image pickup. At the time when the barrier 1051 is opened, the main power source is turned on, and next the control system power source is turned on to turn on the power source of the image pickup system circuits such as the A/D converter 1056.

Thereafter, in order to control a quantity of exposure, the system control and operation unit 1059 releases the iris 1053 and then the signals outputted from the solid-state image pickup apparatus 1054 pass through the image pickup signal processing circuit 1055 to be outputted to the A/D converter 1056. The A/D converter 1056 subjects successively the signals thus outputted thereto to the A/D conversion to output the resultant signals to the signal processing unit 1057. The signal processing unit 1057, on the basis of the data concerned, carries out the arithmetic operation for the exposure in the system control and operation unit 1059.

The brightness is judged on the basis of the result of the photometry, and the system control and operation unit 1059, on the basis of this judgement result, controls the iris.

Next, the high frequency components is fetched on the basis of the signals outputted from the solid-state image pickup apparatus 1054, and then the arithmetic operation for the distance up to the object is carried out in the system control and operation unit 1059. Thereafter, the lens 1052 is driven to judge whether or not the lens is in a focus position. If it is judged that the lens is in focus, then the lens 1052 is driven to carry out the distance measurement.

Then, after it is confirmed that the lens is in focus, the main exposure is started. After completion of the exposure, the image signals outputted from the image pickup apparatus 1054 are successively subjected to the correction and the like in the image pickup signal processing circuit 1055 and then are successively subjected to the A/D conversion in the A/D converter 1056 to be processed by the signal processing unit 1057 and then stored in the memory unit 1060 by the system control and operation unit 1059.

Thereafter, the data stored in the memory unit 1060 is supplied to the recording medium control I/F unit 1061 to be recorded in the detachable recording medium 1062 such as a semiconductor memory in accordance with the control conducted by the system control and operation unit 1059. Also, the data concerned may be supplied the external I/F unit 1063 to be directly inputted to a computer or the like for the processing of an image.

As set forth hereinabove, according to the present invention, since the noise or the like is superimposed on an input signal inputted to a differential amplification unit for amplifying the signal electric charges obtained through the conversion in photoelectric conversion devices, the noise or the like is subjected to the differential operation in a differential amplifier circuit to be removed from an output signal.

While the present invention has been particularly shown and described with reference to the preferred embodiments, it will be understood that the various changes and modifications will occur to those skilled in the art without departing from the scope and true spirit of the invention. The scope of the invention is, therefore, to be determined solely by the appended claims.

What is claimed is:

1. A solid-state image pickup apparatus comprising:

a plurality of photoelectric conversion elements for photoelectrically converting light from an object;

a plurality of vertical signal lines connected in common to said plurality of photoelectric conversion elements;

a first capacitor provided in each vertical signal line;

a first horizontal output line for sequentially outputting signals generated in the photoelectric conversion elements and held in the first capacitors;

a plurality of first switches for controlling continuity between said plurality of vertical signal lines and said first horizontal output line to output the signals held in the first capacitors to said first horizontal output line;

a second horizontal output line for supplying a reference signal;

a plurality of first dummy switches, each connected to said second horizontal output line, each comprising a solid-state device having gate, source, and drain electrodes, and each having its gate electrode fixedly grounded;

scanning means for controlling said plurality of first switches;

differential means for providing a difference output between a signal from said first horizontal output line and a signal from said second output line; and a control line for supplying a control signal from the scanning means to the first switches, wherein the control line crosses said first horizontal output line and said second horizontal output line.

2. A solid-state image pickup system including the solid-state image pickup apparatus set out in claim 1, and further comprising:

a lens for imaging an optical image on the plurality of photoelectric conversion elements; and a signal processing circuit which processes the signals from said plurality of photoelectric conversion elements.

3. The apparatus according to claim 1, wherein the scanning means is grounded to the same ground level as that of said the dummy switches.

* * * * *